(12) United States Patent
Moskal

(10) Patent No.: US 8,484,054 B2
(45) Date of Patent: Jul. 9, 2013

(54) SYSTEM AND METHOD FOR MANAGING ELECTRONIC ACCOUNTS IN RESPONSE TO DISABILITY DATA

(75) Inventor: Matthew Stephen Moskal, West Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 110 days.

(21) Appl. No.: 12/951,594

(22) Filed: Nov. 22, 2010

(65) Prior Publication Data
US 2012/0130752 A1    May 24, 2012

(51) Int. Cl.
*G06Q 40/00*    (2006.01)

(52) U.S. Cl.
USPC ............ 705/4; 705/2; 705/36 R; 705/38; 705/3; 705/34; 705/40; 707/769

(58) Field of Classification Search
USPC .............................. 705/36, 2–4, 38, 707, 769
See application file for complete search history.

(56) References Cited

U.S. PATENT DOCUMENTS

| | | | |
|---|---|---|---|
| 5,523,942 A | 6/1996 | Tyler et al. | |
| 5,655,085 A | 8/1997 | Ryan et al. | |
| 7,249,040 B1 * | 7/2007 | Binns et al. | 705/4 |
| 8,041,585 B1 * | 10/2011 | Binns et al. | 705/4 |
| 2002/0169715 A1 * | 11/2002 | Ruth et al. | 705/40 |
| 2003/0158758 A1 * | 8/2003 | Kanazawa et al. | 705/4 |
| 2006/0080191 A1 | 4/2006 | Hinson | |
| 2007/0005463 A1 * | 1/2007 | Davis et al. | 705/34 |
| 2009/0265190 A1 * | 10/2009 | Ashley et al. | 705/4 |
| 2009/0307011 A1 * | 12/2009 | Colson et al. | 705/4 |
| 2010/0145734 A1 * | 6/2010 | Becerra et al. | 705/4 |

OTHER PUBLICATIONS

Hayley Harrison, "What Is a Waiver of Premium for Life Insurance?", Nov. 25, 2009, 4pgs.
Dwight Chestnut, "What is a Waiver of Premium for Disability for Health Insurance?", Jul. 14, 2010, 4pgs.
Chris Joseph, "What Is a Waiver of Premium Provision on an Insurance Policy?", Sep. 29, 2010, 2pgs.

* cited by examiner

Primary Examiner — Harish T Dass
(74) Attorney, Agent, or Firm — Howard IP Law Group, PC

(57) ABSTRACT

A computer system includes a data storage device that stores a database. The database contains data relating to insurance policies that cover insured individuals. The computer system also includes an input device that is configured to receive data that indicates an employment status for the individuals. A processor is programmed to receive the data that indicates employment status and to adjust data that represents at least one attribute of the insurance policies in response to the employment status data.

21 Claims, 10 Drawing Sheets

US 8,484,054 B2

SYSTEM AND METHOD FOR MANAGING ELECTRONIC ACCOUNTS IN RESPONSE TO DISABILITY DATA

FIELD

The present invention relates to computer systems used in connection with insurance operations.

BACKGROUND

Many insurance policies are written directly to the individual policyholders; personal automobile insurance policies, homeowner's insurance policies and individual term and whole life insurance policies typically fall into this category. In other cases, insurance that personally benefits individuals may be provided in connection with group policies established as the result of cooperation between the insurance company and the employer of the covered individuals. Group life insurance policies and/or long term disability insurance coverage—often partially or entirely subsidized by the employer—are a typical example of the latter type of insurance policy. In some cases, there can be extensions to the relationship established between the insurer and the employees of a company that established a group insurance policy. For example, employees may sign up for individual, personal automobile insurance coverage and/or homeowner's coverage through a group program made available by their employer, with premiums paid to the insurer via deductions from the employees' pay.

The present inventors now disclose an improved method and system for increasing the attractiveness of employer-based insurance plans that personally benefit a company's employees and without burdening the employer.

SUMMARY

An apparatus, method, computer system and computer-readable data storage medium are disclosed which include storing a database in a data storage device, where the database contains data relating to a number of insurance policies that cover insured individuals.

The apparatus, method, computer system and computer-readable data storage medium further include receiving, via an input device, data that indicates the employment status for certain ones of the insured individuals.

Still further, the apparatus, method, computer system and computer-readable data storage medium include adjusting, by use of a computer, data indicative one or more attributes of the insurance policies in response to the data that indicated the individuals' employment status.

In one application of the invention, the data indicates that some of the individuals are in a status such that they are disabled and on leave from work. In response to this data, the computer may reduce or suspend the individuals' obligation to pay premiums on personal automobile insurance or homeowner's policies. This policy feature may be provided as part of a group program in which personal auto or homeowner's insurance is made available via the individuals' employer, and may make the group program more attractive than programs offered by competing insurance companies.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a computer system to administrate an insurance policy—such as a personal automobile insurance policy or a homeowner's insurance policy—may provide that the policyholder's obligation to pay premiums may be reduced or waived during periods when the policyholder is on a disability leave from his/her employment. This system feature may be particularly applicable to situations in which the coverage is paid for via payroll deductions in connection with a group program made available by the policyholder's employer. Automatic exchange of data between the employer and the insurance company may help to alert the insurance company of the occurrence of disability leave status for policyholders and may prompt the insurance company to waive or reduce premiums in those cases.

Figure 1:
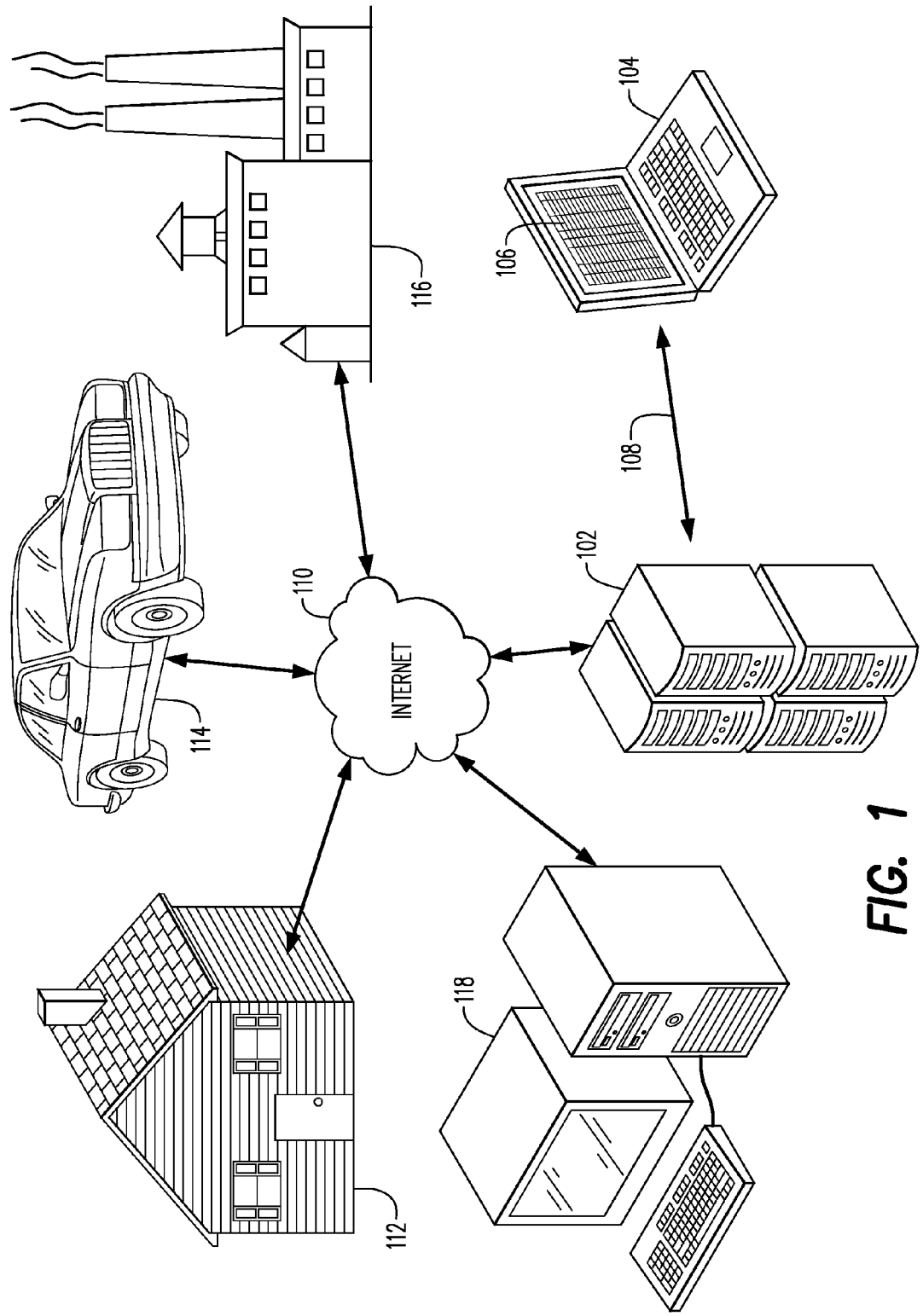
FIG. 1 schematically illustrates an environment in which the present invention may be applied.

FIG. 1 schematically shows aspects of an insurance business. As is customary, the insurance company in question operates one or more central computers, including server computer 102 shown in FIG. 1. Other computers deployed in the insurance company may include personal/notebook computers assigned to individual employees, including the computer indicated by reference numeral 104. One function that may be performed by the computer 104 is displaying data 106 that has been downloaded to the computer 104 from the server computer 102 via a communication path 108.

The server computer 102 may also exchange information with other parties, including for example employers that make available group insurance programs issued by the insurance company. This exchange of information may occur via private and/or public data communication networks, including the Internet (reference numeral 110). Such plans may, for example, provide homeowner's coverage for employees who are owners of residential properties 112; or may provide personal automobile insurance coverage for employees who are owners of motor vehicles 114. The employees may work in a factory 116 or other facility operated by their employer.

Still further, the insurance company may have contractual or other relationships with numerous independent insurance agencies that place and provide services for policies written by the insurance company. Thus the server computer 102 may engage in data communication with computers 118 operated by the company's agents. As indicated at 120, the insurance agent computer 118 includes a screen display by which the agent can view information downloaded to the insurance agent computer 118 from the insurance company server computer 102.

Figure 2:
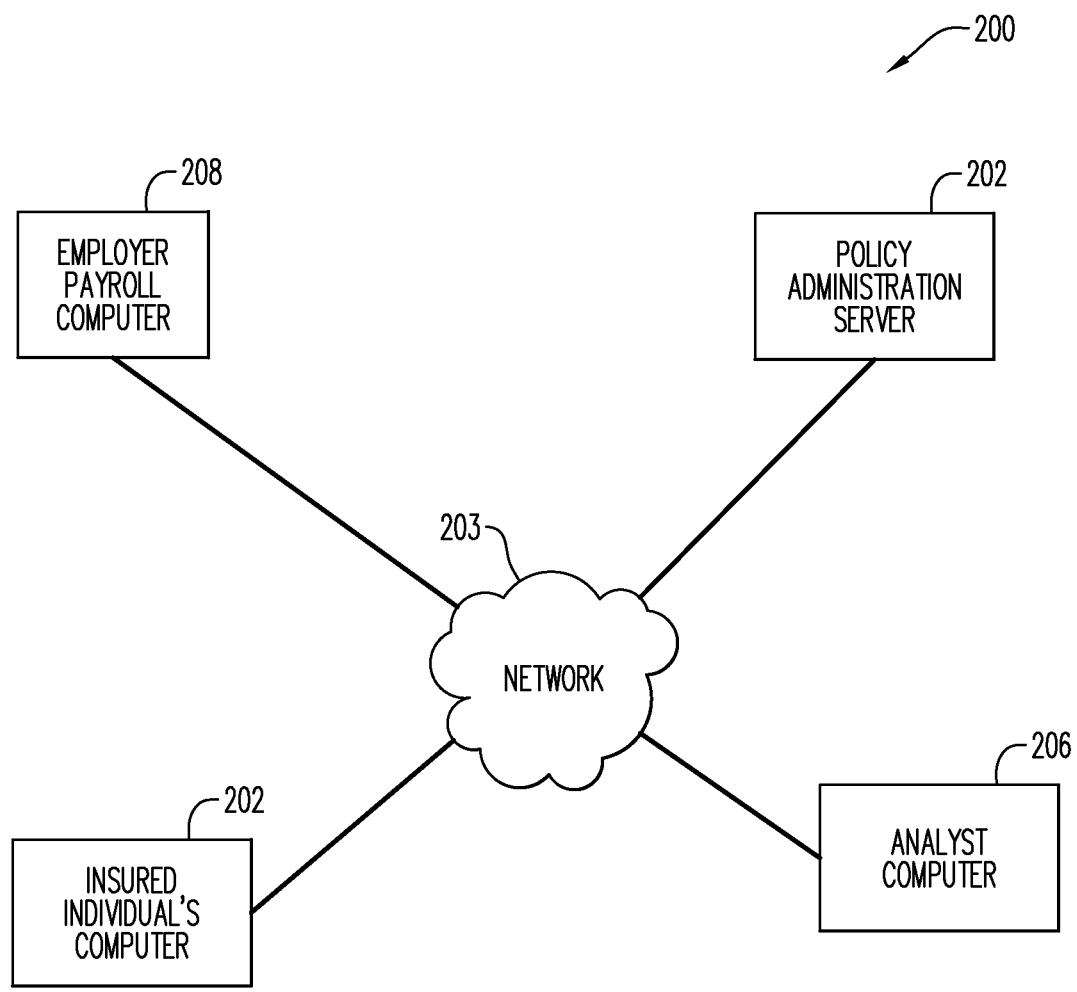
FIG. 2 is a block diagram that illustrates a computer system provided in accordance with aspects of the present invention.

FIG. 2 is a block diagram that illustrates a computer system 200 provided in accordance with aspects of the present invention.

Block 202 in FIG. 2 represents a server computer that is part of the computer system 200. The computer 202 may be operated by an insurance company for the purposes of performing administrative functions relative to insurance policies issued by the insurance company. (For example, the computer 202—which may hereinafter be referred to as the "policy administration server computer"—may correspond to the computer 102 shown in FIG. 1.)

Reference numeral 203 in FIG. 2 represents the Internet or other public or private data communications network. The policy administration server computer 202 may be coupled to the data communication network 203, to allow the policy administration server computer 202 to communicate with other components of the system 200.

The computer system 200, as depicted in FIG. 2, may also include a personal computer 206. The personal computer may be assigned to a billing analyst employee of the insurance company and may be coupled to the data communication network 203. For example, the personal computer may be operated by the billing analyst and interact via the data communication network 203 with the policy administration server computer 202. (Although only one personal computer 206 is shown in the drawing, in practice the system 200 may include numerous computers of this kind The personal computer 206 may hereinafter be referred to as a "billing analyst computer".)

In addition, the computer system 200 may include a server computer 208 that is operated by an employer of individuals covered under a group insurance program offered by the insurance company. The computer 208 may be operated in connection with functions relating to the employer's payroll operations. The computer 208 may also be coupled to the data communication network 203 to permit data communication between the computer 208 and one or more other components of the system 200.

Also shown in FIG. 2 is a personal computer 210 that is owned by an individual policyholder employed by the employer that operates the computer 208. The policyholder computer 210 may be coupled to the data communication network 203, and may for example receive electronic notices transmitted from time to time by the policy administration server computer 202.

Figure 3:
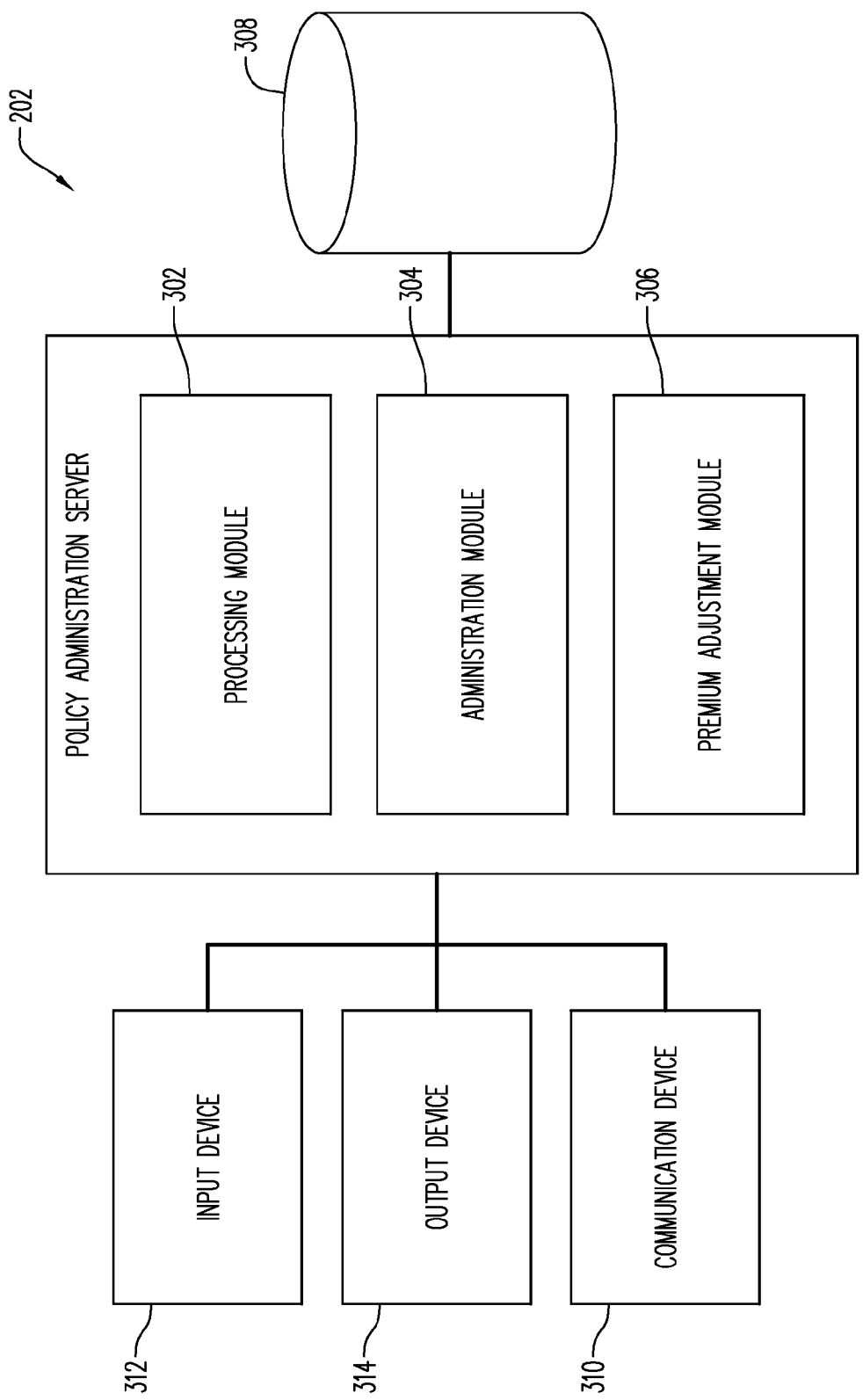
FIG. 3 is a block diagram that illustrates a server computer that is a component of the computer system of FIG. 2.

FIG. 3 is a block diagram representation of the policy administration server computer 202. The policy administration server computer 202 may be conventional in terms of its hardware aspects.

As depicted in FIG. 3, the policy administration server computer 202 includes a processing module 302, which may be constituted by one or more conventional computer processors. The policy administration server computer 202 may also incorporate a policy administration module 304. The policy administration module 304 may operate in many respects in a conventional manner, but may also implement aspects of the present invention, as described herein. The policy administration module 304 may be implemented at least in part in conjunction with the processing module 302 in combination with suitable software program instructions.

The policy administration server computer 202 further includes a premium adjustment module 306. The premium adjustment module 306 may operate, with other components of the policy administration server computer 202 and/or of the system 200, to reduce or waive personal insurance policy premiums for individual policyholders who are on a disability leave status with their employer, in accordance with principles of the present invention. The premium adjustment module 306 may be constituted, at least in part, by the processing module 302 in combination with suitable software program instructions. Aspects of the software program instructions for the premium adjustment module 306 will be described below.

Still further, the policy administration server computer 202 includes one or more storage devices, represented by item 308 in FIG. 3. The storage devices 308 are coupled for data communication with the processing module 302 and may comprise any appropriate information storage device, including combinations of magnetic storage devices (e.g., magnetic tape and hard disk drives), optical storage devices, and/or semiconductor memory devices (such as Random Access Memory (RAM) devices and Read Only Memory (ROM) devices). At least some of these devices may be considered computer-readable storage media, or may include such media. The storage devices 308 may store the above-mentioned software program instructions and/or other program instructions to control the processing module 302 such that the policy administration server computer 202 provides desired functionality, as described herein. Thus, the storage devices 308 store one or more programs for controlling the processing module 302. The processing module 302 performs instructions of the programs, and thereby operates in accordance with aspects of the present invention. In some embodiments, the programs may include one or more conventional operating systems. The programs may further include application programs such as a conventional data communication program and a conventional database management program. The programs stored in the storage devices 308 may also include conventional web hosting software.

The storage devices 308 may also store one or more databases, including for example a database (not separately shown) that contains insurance policy data for a universe of insurance policies, including policies with premium reduction and/or premium waiver riders, as described below.

Continuing to refer to FIG. 3, the policy administration server computer 202 may further include one or more communication devices 310 coupled to the processing module 302. The communication devices 310 may function to facilitate communication with, for example, other devices (such as the employer computer 208—FIG. 2, or the billing analyst computer 206). As such, the communication devices 310 may also serve as input devices in the sense that the communication devices 310 may allow for input of data from other devices into the policy administration server computer 202. For example, the communication devices 310 may receive data files from employers that offer group insurance programs, as described below.

In addition, the policy administration server computer 202 may include one or more input devices 312 such as a keyboard, a keypad, a mouse or other pointing device, a microphone, knob or a switch, an infra-red (IR) port, a docking station and/or a touch screen. The input device(s) 312 may be coupled to the processing module 302. Still further the policy administration server computer 202 may include one or more output devices 314, such as a display (e.g., a display screen), a speaker, and/or a printer. The output devices 314 may also be coupled to the processing module 302.

Figure 4:
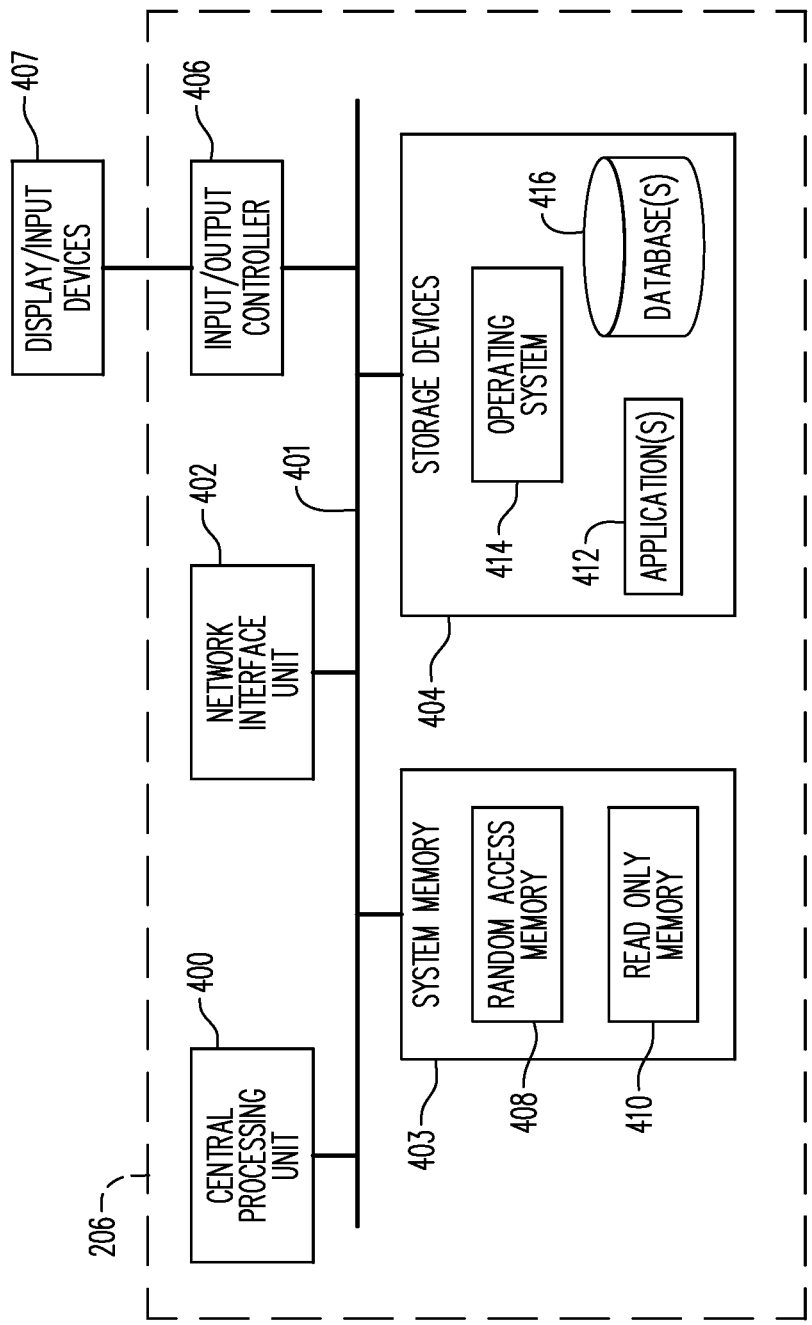
FIG. 4 is a block diagram of a typical personal computer that may be used by an insurance company billing analyst in the system of FIG. 2.

FIG. 4 is a block diagram representation of a typical embodiment of the billing analyst computer 206 shown in FIG. 2. The billing analyst computer 206 may be conventional in terms of its hardware aspects. The billing analyst computer 206 may also be essentially conventional in its software aspects, except that via a browser it may provide functionality in accordance with aspects of the present invention as disclosed herein.

As depicted in FIG. 4, the billing analyst computer 206 includes a data bus 401. The billing analyst computer 206 also includes a computer processor (CPU) 400 which is operatively coupled to the data bus 401 and which may be constituted by one or more conventional processors. The billing analyst computer 206 further includes a network interface unit 402, system memory 403, one or more storage devices 404, and an input/output controller 406, all of which are also operatively coupled to the data bus 401.

The network interface unit 402 may function to facilitate communication with, for example, other devices (such as the policy administration server computer 202). The input/output controller 406 may couple the billing analyst computer 206 to input and output devices (not shown) such as a keyboard, a keypad, a mouse or other pointing device, a microphone, knob or a switch, an infra-red (IR) port, a docking station, a touch screen, a display (e.g., a display screen), a speaker, and/or a printer. The display and/or input devices are represented by block 407 and may, e.g., include a flat panel display or other display device for presenting screen displays to the user of the billing analyst computer 206.

The system memory 403 may be constituted by, for example, a suitable combination of Random Access Memory (RAM) devices 408 and Read Only Memory (ROM) devices 410.

Storage devices 404 may comprise any appropriate information storage device, including combinations of magnetic storage devices (e.g., magnetic tape and hard disk drives), optical storage devices, and/or semiconductor memory devices. At least some of these devices (and/or all or part of the system memory 403) may be considered computer-readable storage media, or may include such media.

Storage devices 404 store one or more programs (at least some of which being indicated by blocks 412, 414) for controlling CPU 400. CPU 400 performs instructions of the programs, and thereby operates in accordance with aspects of the present invention. In some embodiments, the programs may include one or more conventional operating systems, indicated by block 414 in FIG. 4. The programs may further include application programs (block 412) such as a conventional data communication program and a conventional browser. The application programs 412 may, for example, include a conventional electronic mail program and a conventional database management program.

There may also be stored in the storage devices 404 other software, such as device drivers, etc.

Still further, the storage devices 404 may store one or more databases (block 416) for storing and managing the data relating to operation of the billing analyst computer 206.

Figure 5A:
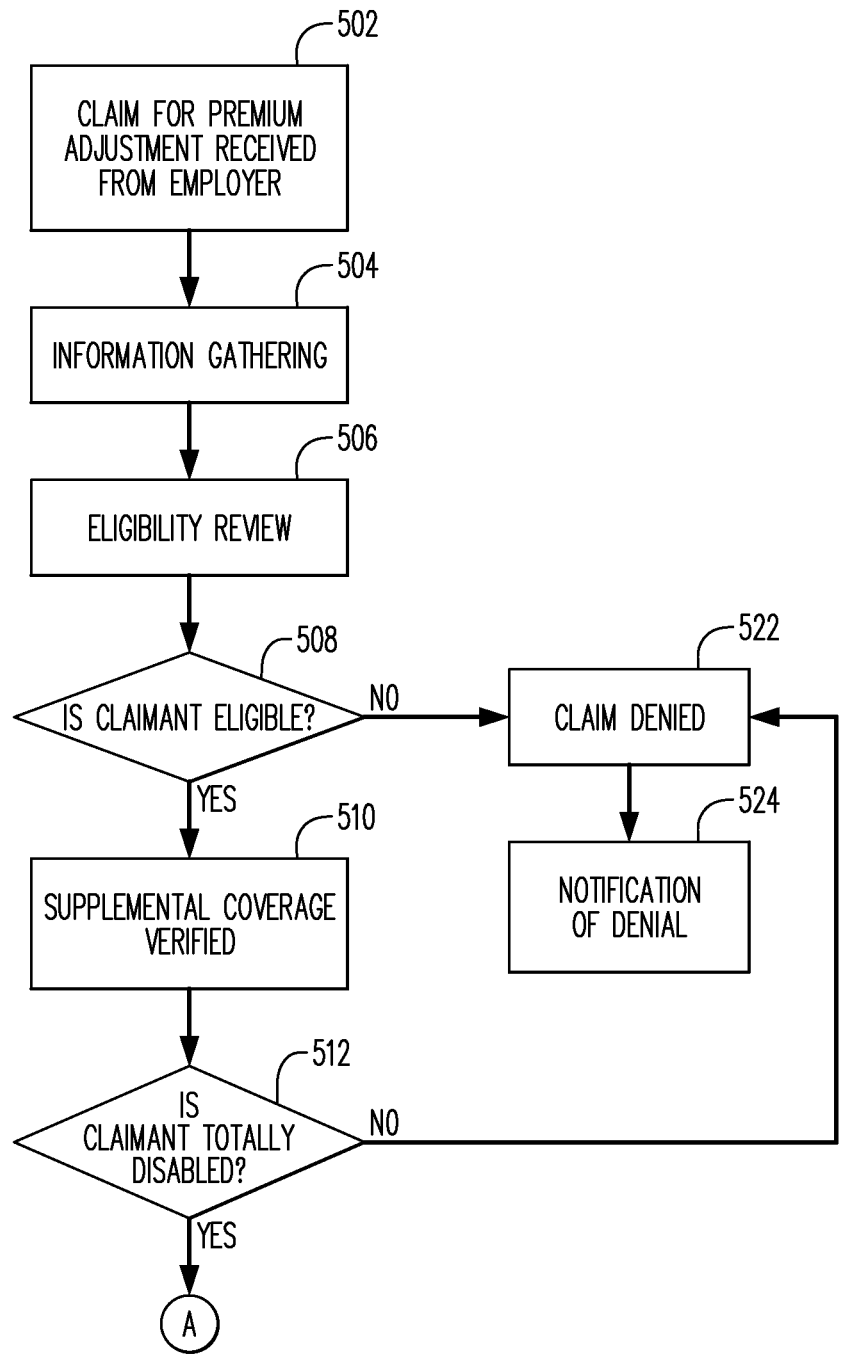
FIGS. 5A and 5B together form a flow chart that illustrates a process that may be performed in accordance with aspects of the invention in the system of FIG. 2.
Figure 5B:
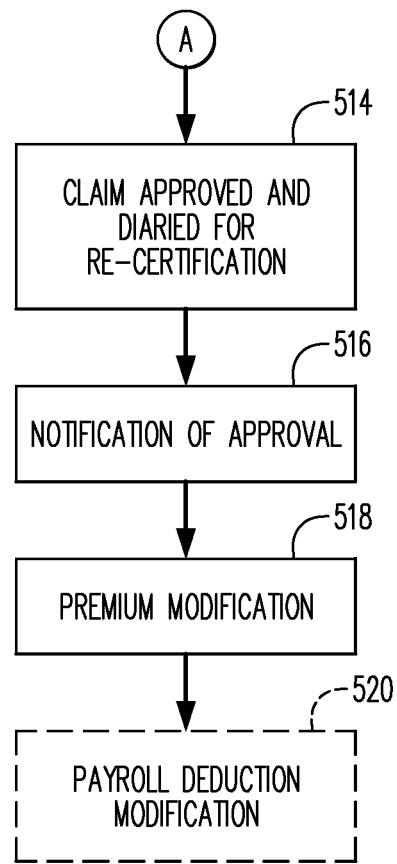

FIGS. 5A and 5B together form a flow chart that illustrates a process that may be performed in accordance with aspects of the invention in the system 200.

At 502 in FIG. 5A, the insurance company receives a request for adjustment of the premium for personal insurance coverage provided to an employee of a corporation (the "employer") that makes available to its employees a group program offered by the insurance company. The insurance company may receive the request from the employer. The reason for the employer submitting the request may be that the employee has just been placed on leave from his/her employment because he/she is disabled from working The request may, in some embodiments, relate to personal automobile insurance coverage provided to the insured/employee by the insurance company. The insurance coverage may contain a rider that provides that the insured individual's premiums will be reduced (e.g., partially waived) by a predetermined amount during periods in which the insured is disabled. The request submitted at 502 may be for reduction of the employee's personal automobile insurance premium pursuant to the rider.

The insurance company may offer this rider at no charge as an additional attractive feature of the group program offered through the employer. In underwriting terms, it may make good business sense for the insurance company to offer this rider because on average it is likely that the employee will tend to drive his/her automobile less during a period of disability. For example, a large part of the use of the automobile typically may have been for commuting to work, which will not occur during the period of disability. Alternatively, there may be a charge for the rider.

Referring again to FIG. 5A, at 504 information is gathered to assemble a file relative to the request received at 502. This may occur automatically via the policy administration server computer 202 and/or may represent activities undertaken by a billing analyst to whom the request is assigned. This may involve gathering various file components related to the request, including information about the insured individual and the individual's enrollment history.

Figure 6:
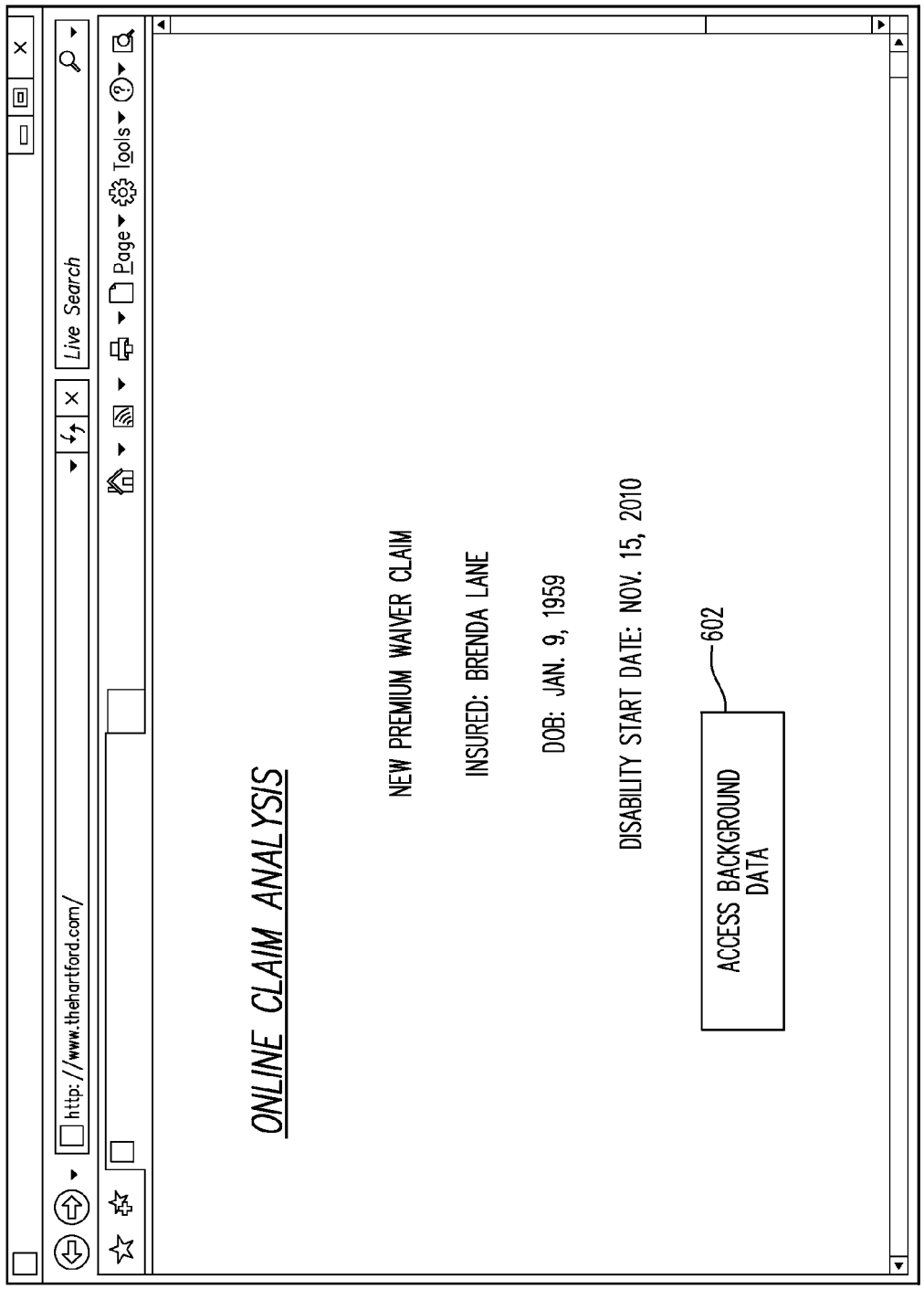
FIG. 6 shows an example screen display that may be provided to a user by the system of FIG. 2.

FIG. 6 shows an example screen display that may be provided to a user (e.g., an insured individual) to initiate the process of FIGS. 5A/5B. The screen display of FIG. 6 may be provided to the insured individual via the display component of the insured individual's computer 210 shown in FIG. 2. For example, this screen display may be downloaded from the policy administration server computer 202 to the insured individual's computer 210 via the browser in the insured individual's computer 210.

At 506, the billing analyst may perform a review as to whether the insured individual is entitled to the requested reduction in premium. For example, the billing analyst may determine whether the insured individual falls into a class of insureds who are eligible for premium reduction, whether the insured individual was properly enrolled under the premium reduction rider, whether the insured individual meets any applicable age limit, and whether the insured individual's personal automobile insurance policy was in force as of the last day the individual worked before entering his/her disability leave.

Following block 506 is a decision block 508. At decision block 508, it is determined whether the individual insured is eligible for a premium reduction under the rider. This determination may be made, for example, based on the information gathered and considered at 504 and 506. If a positive determination is made at decision block 508 (i.e., if it is determined that the insured individual is eligible for a premium reduction), then the process of FIGS. 5A and 5B advances from decision block 508 to block 510. At block 510, the billing analyst verifies that the rider covers the insured individual. In addition, the billing analyst may obtain medical information concerning the insured individual.

Decision block 512 follows block 510. At decision block 512, it is determined whether the insured individual is totally disabled (i.e., is unable to perform any work, whether full-time or part-time). If a positive determination is made at decision block 512 (i.e., if it is determined that the insured individual is totally disabled), then the process of FIGS. 5A and 5B advances from decision block 512 in FIG. 5A to block 514 in FIG. 5B.

At block 514, the request for premium reduction is approved and the request file is entered into a diary file for reconsideration/re-certification after a predetermined period of time has elapsed.

In some embodiments, the review of the request for premium reduction and/or the reconsideration/re-certification may include verifying that the insured individual is in fact receiving payments under his/her disability insurance coverage. In this way, the process for considering/reconsidering the premium reduction may rely on the disability claim processing outcome arrived at by the disability coverage provider. In some embodiments, the disability coverage provider may be a different insurance company from the insurer that is providing the personal automobile coverage. In this case, the policy administration server computer 202 may engage in an automatic exchange of information with a computer operated by the disability coverage provider to determine whether the insured individual's disability claim is being paid. There may be a similar exchange of information even in a case where the auto insurer is also the disability insurer, if a separate computer from the policy administration server computer 202 is administrating disability claim handling. In addition or alternatively, the policy administration server computer 202 may receive information about disability status or claim payments from a payroll services contractor retained by the employer of the insured individual, or from the insured individual himself/herself.

In some embodiments, the premium reduction/waiver may be applied for no more than a limited period of time, say six months or one year.

In some embodiments, reconsideration/re-certification may include determining whether a scheduled ending date for the disability status has arrived, and then terminating the premium reduction/waiver if that date has arrived.

In some embodiments, if the insured individual's employment terminates, the disability status and the premium reduction/waiver may also terminate.

Block 516 follows block 514. At block 516, notification that the request for premium reduction has been approved is sent out. This may be done by either or both of electronic mail and postal mail, and may involve sending the notification to either or both of the insured individual and the employer. If the approval notification to the insured individual is in electronic form, it may prompt the insured individual to provide input (e.g., by clicking a virtual "verify" button) to verify his/her disability status.

Block 518 follows block 516. At block 518, suitable data is entered/stored in the policy administration server computer 202 such that the premium reduction is implemented for the insured individual's personal automobile insurance coverage. In some cases this may result in a reduction of the amounts of future bills for the premium, and/or in a partial refund to the insured individual of premium amounts already paid.

If the insured individual has been paying for the premium by deductions from the individual's pay, then block 520 may follow block 518 in FIG. 5B. At block 520 the policy administration server computer 202 may take action to change the deduction activity relative to the individual's pay. For example, the individual may no longer receive a paycheck while he/she is on disability leave, so that deductions for premium payments for the individual's personal automobile insurance coverage may be interrupted, and the policy administration server computer 202 may proceed with billing the individual directly for the reduced premium. In some embodiments, if the individual has paid in advance for the premium that is subject to reduction, then the individual may receive a credit against future premiums or a refund to reflect the amount of the reduction.

Referring again to decision block 508 in FIG. 5A, if a negative determination is made at that decision block (i.e., if it is determined that the insured individual is not eligible for a premium reduction), then the process may advance from decision block 508 to block 522 in FIG. 5A. At block 522, the request for a premium reduction is denied. Then, block 524 follows block 522. At block 524, the insurance company sends out a notification that the premium reduction is denied. As in the case of block 516, the notification may be by electronic mail and/or postal mail, and may be sent to the employer and/or the insured individual.

Referring again to decision block 512 in FIG. 5A, if a negative determination is made at that decision block (i.e., if it is determined that the insured individual is not totally disabled), then the process may advance from decision block 512 to blocks 522 and 524 as described in the previous paragraph.

In the process of FIGS. 5A and 5B, actions described therein, including actions performed by the billing analyst, may in some embodiments be at least partially performed automatically by a computer such as the policy administration server computer 202. This may be done, for example, by a software-programmed expert system that has been designed to gather, assess and make determinations concerning, premium reduction request files. In other words, in some embodiments, the process of FIGS. 5A and 5B may be partially or entirely automated.

Figure 7A:
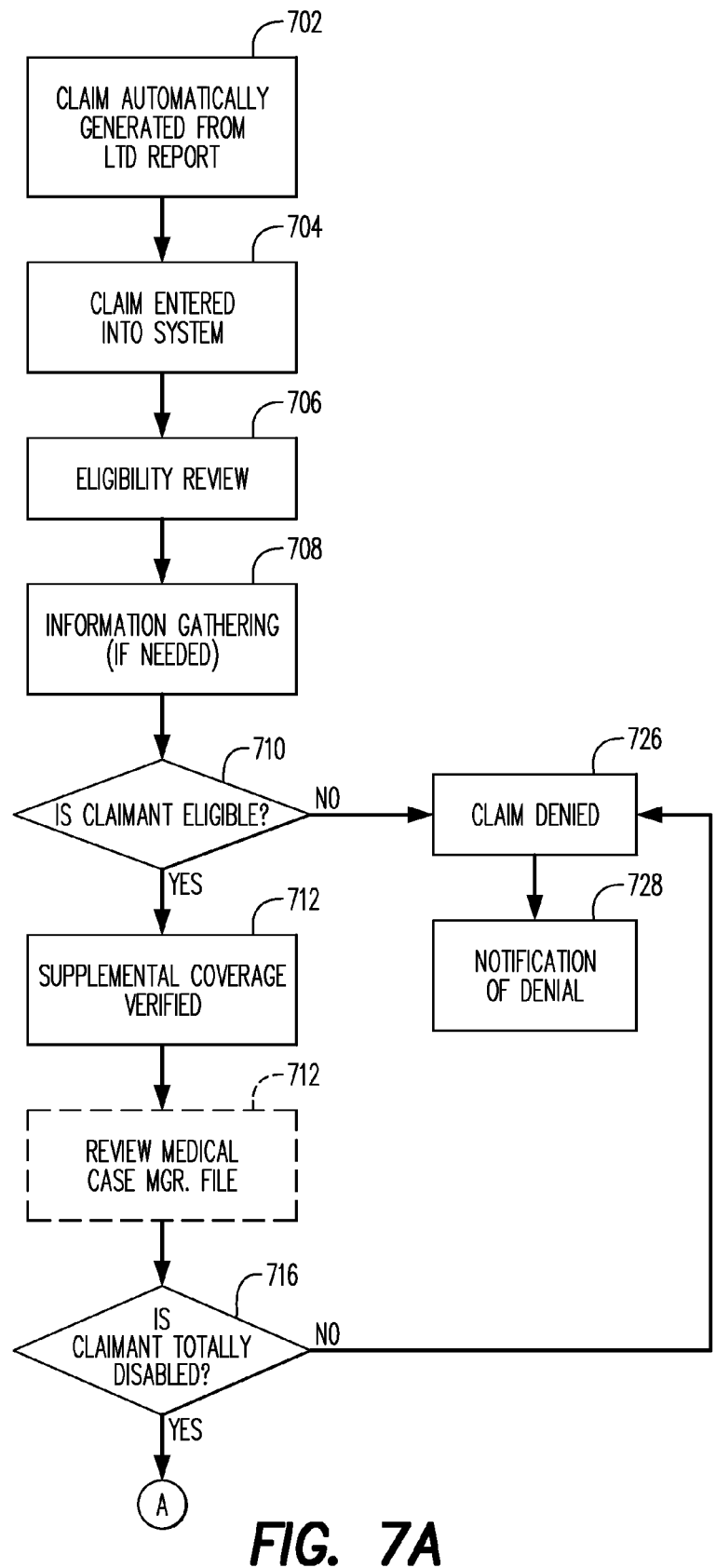
FIGS. 7A and 7B together form a flow chart that illustrates an alternative process that may be performed in accordance with aspects of the invention in the system of FIG. 2.
Figure 7B:
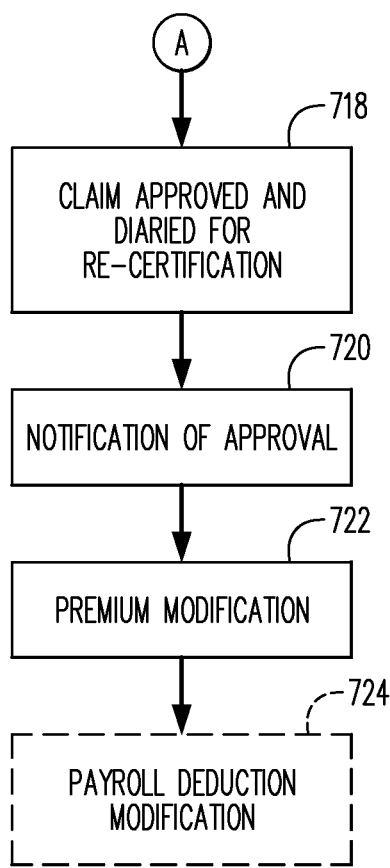

FIGS. 7A and 7B together form a flow chart that illustrates an alternative process that may be performed in accordance with aspects of the invention in the system 200. One possible difference between the respective processes of FIGS. 5A/5B and of FIGS. 7A/7B is that in the latter, the insurance company may automatically generate a premium reduction request for the insured/disabled individual based on reports of new disability benefit claims received by the insurance company from the employer. That is, in the process of FIGS. 7A/7B, the insurance company may itself initiate the premium reduction process instead of the process being initiated by a request submitted by the employer as in the process of FIGS. 5A and 5B.

Turning then to FIG. 7A, at 702, the insurance company (e.g., via the policy administration server computer 202) may automatically parse the report of disability claims received from the employer and may generate premium reduction requests for each newly disabled employee who appears in the disability claim report. For each premium reduction request so generated, block 704 may follow block 702. At 704 the new premium reduction request is entered into the request handling system and assigned to a billing analyst.

Block 706 (eligibility review) then follows block 704. Block 706 may be substantially the same as block 506 as described above in connection with FIG. 5A.

Block 708 then follows block 706. At block 708, for example, the billing analyst may review the insured individual's disability claim file, and may request further information if needed based on the review of the disability claim file.

Decision block 710 follows block 708 in the process of FIGS. 7A and 7B. Decision block 710 may be the same as decision block 508 as described above in connection with FIG. 5A. If a positive determination is made at decision block 710, the process of FIGS. 7A/7B may advance from decision block 710 to block 712. Block 712 may be the same as the block 510 described above in connection with FIG. 5A.

In some cases, block 714 may follow block 712 in the process of FIGS. 7A/7B. At block 714, the billing analyst may, if appropriate, review documentation prepared by the medical case manager for the insured individual's disability case. If necessary the billing analyst may consult with the medical case manager to determine the insured individual's functional limitations.

In the process of FIGS. 7A/7B, decision block 716 may follow block 712 or 714, as the case may be. Decision block 716 may be the same as the decision block 512 described above in connection with FIG. 5A. If a positive determination is made at decision block 716, then blocks 718, 720, 722 and 724 (all shown in FIG. 7B) may follow decision block 716. Blocks 718-724 may be the same as the blocks 514-520 as described above in connection with FIG. 5B.

Referring again to decision block 710 in FIG. 7A, if a negative determination is made at that decision block, then blocks 726 and 728 in FIG. 7A may follow decision block 710. Blocks 726 and 728 may be the same as the blocks 522 and 524 as described above in connection with FIG. 5A.

Referring again to decision block 716 in FIG. 7A, if a negative determination is made at that decision block, then blocks 726 and 728 may follow decision block 716.

As was the case with the process of FIGS. 5A/5B, in the process of FIGS. 7A/7B, some or all of the activities that are performed in some implementations by the billing analyst may alternatively be automated in other implementations.

One advantage of the process of FIGS. 7A/7B is that the premium reduction/waiver program may be implemented without imposing any burden on, or requiring any changes in procedure by, the employer of the insured individual.

Figure 8:
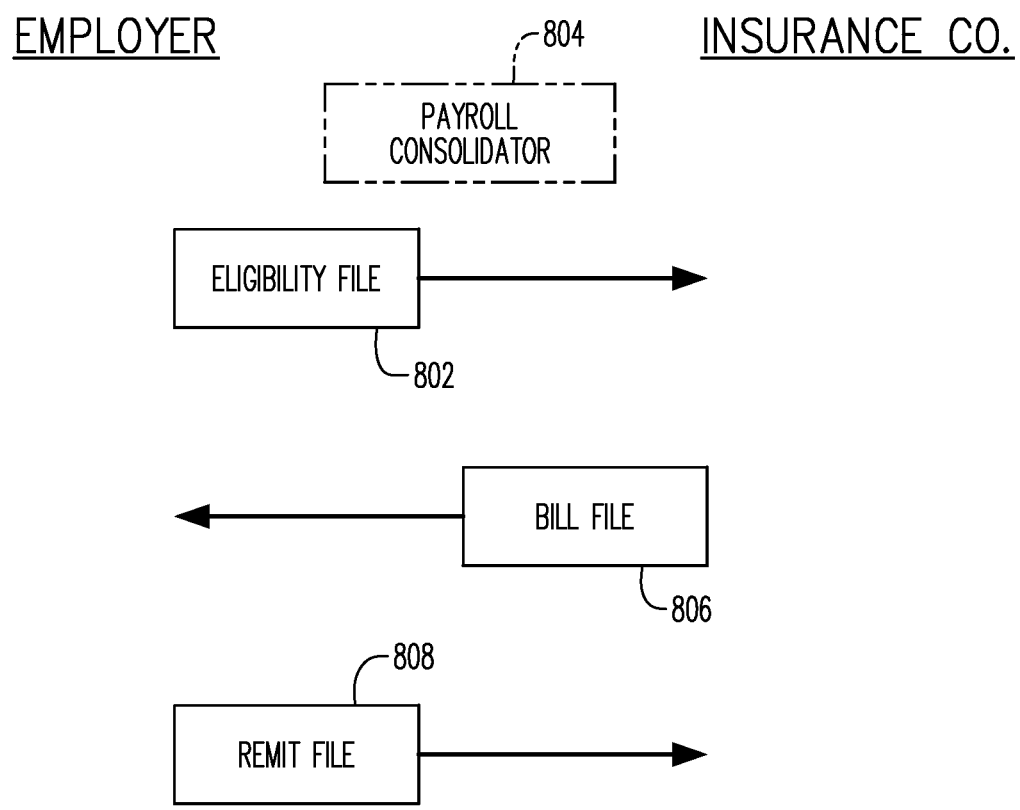
FIG. 8 graphically illustrates an exchange of data files that may occur between an insurance company and an employer in the system of FIG. 2.

FIG. 8 graphically illustrates an exchange of data files that may occur between an insurance company and an employer in the system 200. This exchange of data may underlie the automated generation of premium reduction requests as in the process of FIGS. 7A/7B.

At 802, an "eligibility" data file is transmitted from the employer to the insurance company. This may be done at regular intervals, such as weekly. This file may originate from the internal payroll department or outside payroll administrator for the employer. (As indicated at 804, a payroll consolidation contractor may be an intermediary for one or more of the data exchanges between the employer and the insurance company.)

The eligibility data file 802 may include employee identification information/ID numbers as well as the names and addresses of the employees. The payroll cycle applicable to each employee may also be identified. The file may verify the employees' status as employees at the time of the effectiveness of a group insurance program and/or at the time of renewal of such a program. The eligibility data file 802 may also provide background for a prospective payroll deduction for the employees.

At 806, the insurance company transmits a "bill" file to the employer. A purpose of the bill file 806 is to request payroll deductions from employees' pay to fund premium payments by the employees for insurance coverage provided by the insurance company. For example, the premiums deducted from the employees' pay may be for either or both of personal automobile insurance and homeowner's insurance. For each relevant employee, the insurance company calculates the appropriate amount of the deduction and inserts that amount in the bill file 806. The insurance company sends the bill file 806 at an appropriate time before the next payroll cycle to which the file 806 pertains. A separate bill file may be sent for each payroll cycle that is in effect for the employer (e.g., weekly, semi-monthly and/or monthly payroll cycles).

At 808, the employer transmits a "remit" file to the insurance company. This may be done shortly after each payroll cycle and may reflect the deductions made from the employees' pay in the payroll cycle. In particular, the remit file may include the employee identification numbers, amounts deducted and a status code for each employee.

The status code may, for example, indicate whether the employee is on a disability leave of absence or on another type of leave. From these codes (e.g., from a change in status to "on disability"), the policy administration server computer 202 may initiate premium reduction requests, as described in connection with FIGS. 7A and 7B. In addition, the insurance company may post the remitted deduction amounts as premium payments, and may look into any discrepancies with the employer.

In the above discussion of FIGS. 5A, 5B, 7A and 7B, a premium reduction rider was described. Alternatively, however, a rider may be provided to completely waive the premium during periods in which the insured is on disability leave. In some embodiments, there may be a separate charge for this rider.

The above description discusses premium reduction or waiver with respect to premiums for personal automobile insurance coverage. In addition or alternatively, such a premium reduction or waiver rider may be applied to one or more of homeowner's insurance, renter's insurance, condo insurance, umbrella liability policies, motorcycle insurance, boat insurance, golf cart insurance, snowmobile insurance and offroad vehicle insurance. It may be feasible to provide a premium waiver rider without charge for homeowner's insurance premiums, if studies show that the presence of disabled insured individuals at their homes may tend to reduce the frequency and/or severity of claims due to burglary, fire, water damage, etc.

The operation of premium reduction or waiver riders has been described in the context of group plans, including those paid for by payroll deductions. However, premium reduction or waiver riders may also be applied, in accordance with the invention, to personal automobile and/or homeowner's policies that are billed directly to the insured and/or which are not provided through group programs.

In embodiments described above, the premium for an insurance policy was reduced or waived for periods when the insured was on disability leave. In addition or alternatively, other policy terms besides the premium due may be modified in case the insured is disabled. For example, the policy liability limit and/or deductibles may be raised or lowered in such circumstances. As used in the present disclosure and the pending claims, the term "attribute" as applied to an insurance policy includes the premiums charged, before or after any waiver or reduction, and other policy terms such as liability limit or deductibles.

Above-described embodiments have provided that policy terms, such as the amount of premium due, may be modified for periods when the insured is on disability leave. However, the same may alternatively occur during other periods of absence from work, such as maternity or paternity leave. In some embodiments, the insurance policy term modification may apply only for periods when the insured is confined to a hospital or rehabilitation facility. In some embodiments, the insurance policy term modification may apply only to certain types of injuries and/or illnesses.

In some embodiments, a GPS tracking device or the like may be installed on the insured individual's car to confirm that usage of the covered vehicle is actually decreased. In the event that the usage does not decrease, the premium reduction or waiver may be withdrawn.

Where disability claims or status are referred to herein, the same may be long-term disability or short-term disability. In some embodiments, the amount of premium reduction/waiver or other change in attributes of the insurance policy may depend on whether the disability status is long term or short term. More generally, the type and/or degree of policy attribute adjustment, if any, may depend on the type of change in employment status.

Processes portrayed herein as being performed by one computer may in practice be divided among two or more computers. Processes portrayed herein as being performed by two or more computers may in practice be performed by a single computer. The process descriptions and flow charts contained herein should not be considered to imply a fixed order for performing process steps. Rather, process steps may be performed in any order that is practicable.

As used herein and in the appended claims, the term "adjusting" includes any change in an attribute of an insurance policy or in data that represents the attribute.

As used herein and in the appended claims, the term "computer" refers to a single computer or to two or more computers in communication with each other and/or operated by a single organization or by two or more organizations that are partly or entirely under common ownership and/or control.

As used herein and in the appended claims, the term "processor" refers to one processor or two or more processors that are in communication with each other.

As used herein and in the appended claims, the term "memory" refers to one, two or more memory and/or data storage devices.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system for administrating an insurance premium adjustment program, the system comprising:
    a data storage device that stores a database, the database containing data relating to a plurality of personal insurance policies that cover individuals;
    an input device configured to receive data indicative of a disability status for ones of said individuals, the data received from at least one employer of said individuals, the disability status associated with a disability insurance policy of the at least one employer;
    a processor in communication with the data storage device and the input device; and
    a non-transitory storage medium in communication with the processor and storing program instructions, the processor operative with the program instructions to:
        receive the data indicative of disability status;
        determine which of the individuals are disabled, the determination made based on a verification of whether payments are being made to the individual under the disability insurance policy of the at least one employer;
        adjust data indicative of premiums associated with said personal insurance policies of each of said individuals that are disabled in response to the data indicative of disability status.

2. The computer system of claim 1, wherein the processor is further operative with the program instructions to:
    reduce said premiums in response to the data indicative of disability status.

3. The computer system of claim 1, wherein the processor is further operative with the program instructions to:
    waive all or part of said premiums in response to the data indicative of disability status.

4. A method of operating a computer system, the method comprising:
    storing, in a data storage device, a database that contains data relating to a plurality of personal insurance policies that cover individual drivers or households;
    receiving, via an input device, data indicative of a disability status for ones of said individual drivers or households, the disability status based on a verification of whether disability payments are being made to ones of said individual drivers or households under a disability insurance policy of at least a first employer;
    storing the data indicative of the disability status in the data storage device; and
    adjusting, by a computer, data indicative of premiums associated with said personal insurance policies in response to the data indicative of disability status.

5. The method of claim 4, further comprising:
    reducing said premiums in response to the data indicative of disability status.

6. The method of claim 4, further comprising:
    waiving all or part of said premiums in response to the data indicative of disability status.

7. The method of claim 4, wherein the data indicative of disability status is received from an employer of said individual drivers or households.

8. A computer system for administrating insurance policies, the system comprising:
    a data storage device that stores a database, the database containing data relating to a plurality of personal insurance policies that cover insured individuals;
    an input device configured to receive data indicative of an employment disability status for ones of said insured individuals;
    a processor in communication with the data storage device and the input device; and
    a non-transitory storage medium in communication with the processor and having program instructions stored thereon, the processor operative with the program instructions to:
        receive the data indicative of employment disability status, the data received from at least one employer of said insured individuals and the employment disability status associated with a disability insurance policy of the at least one employer;
        determine which of the individuals are disabled by verifying whether payments are being made to the individual under the disability insurance policy of the at least one employer; and
        adjust data indicative of at least one attribute of said personal insurance policies in response to the determination of which of the individuals are disabled.

9. The computer system of claim 8, wherein the personal insurance policies include at least one of: personal automobile insurance policies, homeowner's insurance policies, renter's insurance policies, condominium insurance policies, umbrella liability insurance policies, motorcycle insurance policies, boat insurance policies, golf cart insurance policies, snowmobile insurance policies and offroad vehicle insurance policies.

10. The computer system of claim 9, wherein the processor is further operable with the program instructions to:
    determine whether a termination date for said employment disability status has been reached.

11. The computer system of claim 9, wherein the adjusted data relates to a premium payable for the insurance policies.

12. The computer system of claim 11, wherein the processor is further operable with the program instructions to:
reduce the premium associated with personal insurance policies for insured individuals that are determined to be disabled.

13. The computer system of claim 12, wherein the processor is further operable with the program instructions to:
reduce payroll deductions for the personal insurance premium for insured individuals that are determined to be disabled.

14. The computer system of claim 11, wherein the processor is further operable with the program instructions to:
waive all or part of the premium associated with personal insurance policies for insured individuals that are determined to be disabled.

15. The computer system of claim 14, wherein the processor is further operable with the program instructions to:
suspend payroll deductions for the personal insurance premium for insured individuals that are determined to be disabled.

16. The computer system of claim 14, wherein the processor is further operable with the program instructions to:
send messages to said insured individuals to notify them of the premium waivers; and
require said insured individuals to provide user input to verify that they are disabled.

17. The computer system of claim 9, wherein the adjusted data relates to at least one of a policy liability limit and a deductible.

18. The computer system of claim 8, wherein the data indicative of an employment disability status indicates ones of said insured individuals are on leave from their employment.

19. A computer implemented method, the computer implemented method comprising:
storing, in a data storage device, a database that contains data relating to a plurality of personal insurance policies that cover insured individuals;
receiving, via an input device, data indicative of an absence status for ones of said insured individuals, the data indicative of the absence status provided by at least a first employer and based on information associated with a disability insurance policy of the at least first employer; and
adjusting, by a computer, data stored in the data storage device, that indicates at least one attribute of said personal insurance policies in response to the data indicative of an absence status.

20. The method of claim 19, wherein the personal insurance policies are personal automobile insurance policies and/or homeowner's insurance policies.

21. The method system of claim 20, wherein the absence status is disability status.

* * * * *